(12) United States Patent
Carter et al.

(10) Patent No.: US 9,057,564 B2
(45) Date of Patent: Jun. 16, 2015

(54) COOLING TOWER WITH INDIRECT HEAT EXCHANGER

(71) Applicant: Baltimore Aircoil Company, Inc., Jessup, MD (US)

(72) Inventors: Thomas Carter, Olney, MD (US); Zan Liu, Jessup, MD (US); David Andrew Aaron, Jessup, MD (US); Philip Hollander, Jessup, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 291 days.

(21) Appl. No.: 13/716,772

(22) Filed: Dec. 17, 2012

(65) Prior Publication Data

US 2014/0166240 A1 Jun. 19, 2014

(51) Int. Cl.
*B01F 3/04* (2006.01)
*F28D 15/00* (2006.01)
*F28F 3/00* (2006.01)
*F28C 3/06* (2006.01)

(52) U.S. Cl.
CPC ............ *F28D 15/00* (2013.01); *B01F 3/04468* (2013.01); *F28F 3/005* (2013.01); *F28C 3/06* (2013.01)

(58) Field of Classification Search
CPC .... B01F 3/04; B01F 3/04468; B01F 3/04466; F28C 3/06; F28F 3/00; F28F 3/005
USPC ......... 261/151, 152, 153, 155, 156, 161, 115, 261/117, DIG. 11; 62/304, 305, 310, 314; 165/166, 167, 170
See application file for complete search history.

(56) References Cited

U.S. PATENT DOCUMENTS

| 4,434,112 | A | | 2/1984 | Pollock | |
|---|---|---|---|---|---|
| 4,544,513 | A | | 10/1985 | Otterbein | |
| 5,435,382 | A | | 7/1995 | Carter | |
| 5,664,433 | A | * | 9/1997 | Bourne et al. | .................. 62/314 |
| 5,913,361 | A | | 6/1999 | Engstrom et al. | |
| 6,032,470 | A | | 3/2000 | Haselden | |
| 6,516,874 | B2 | | 2/2003 | Mathur et al. | |
| 6,598,862 | B2 | * | 7/2003 | Merrill et al. | .................. 261/128 |
| 6,745,826 | B2 | | 6/2004 | Lowenstein et al. | |
| 2014/0096555 | A1 | | 4/2014 | Ayub et al. | |

* cited by examiner

*Primary Examiner* — Robert A Hopkins
(74) *Attorney, Agent, or Firm* — Edward J. Brosius

(57) ABSTRACT

A heat exchange apparatus is provided with an indirect evaporative heat exchange section and a direct evaporative heat exchange section. The indirect evaporative heat exchange section is usually located above the direct evaporative heat exchange section, and an evaporative liquid is passed downwardly onto the indirect heat exchange section. The evaporative liquid that exits the indirect evaporative heat exchange section then passes downwardly across and through the direct heat exchange section. The evaporative liquid is collected in a sump and then pumped upwardly to be distributed again across the indirect heat exchange section. The indirect heat exchange section is comprised of a plate type heat exchanger. An improved heat exchange apparatus is provided with indirect evaporative heat exchange section consisting of a plate type heat exchanger which provides more surface area per volume compared to other designs. The indirect plate style heat exchanger may be combined with one or more direct evaporative heat exchange sections in multiple arrangements.

36 Claims, 9 Drawing Sheets

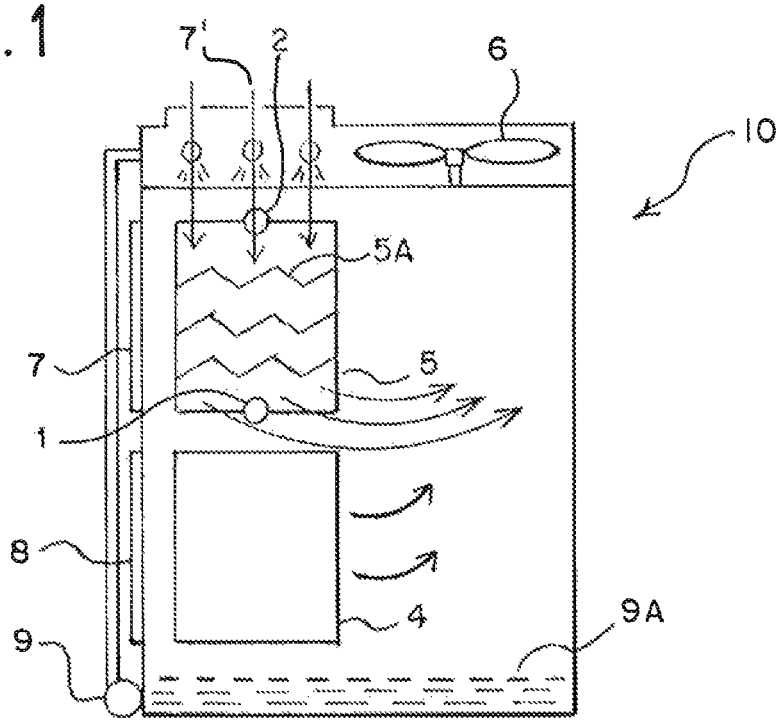
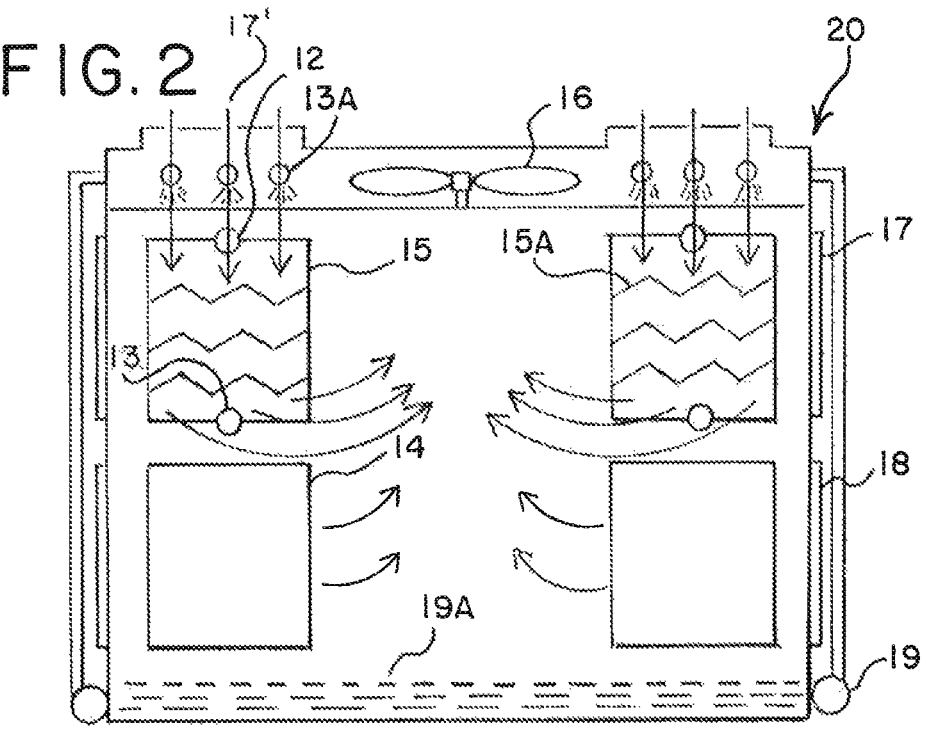

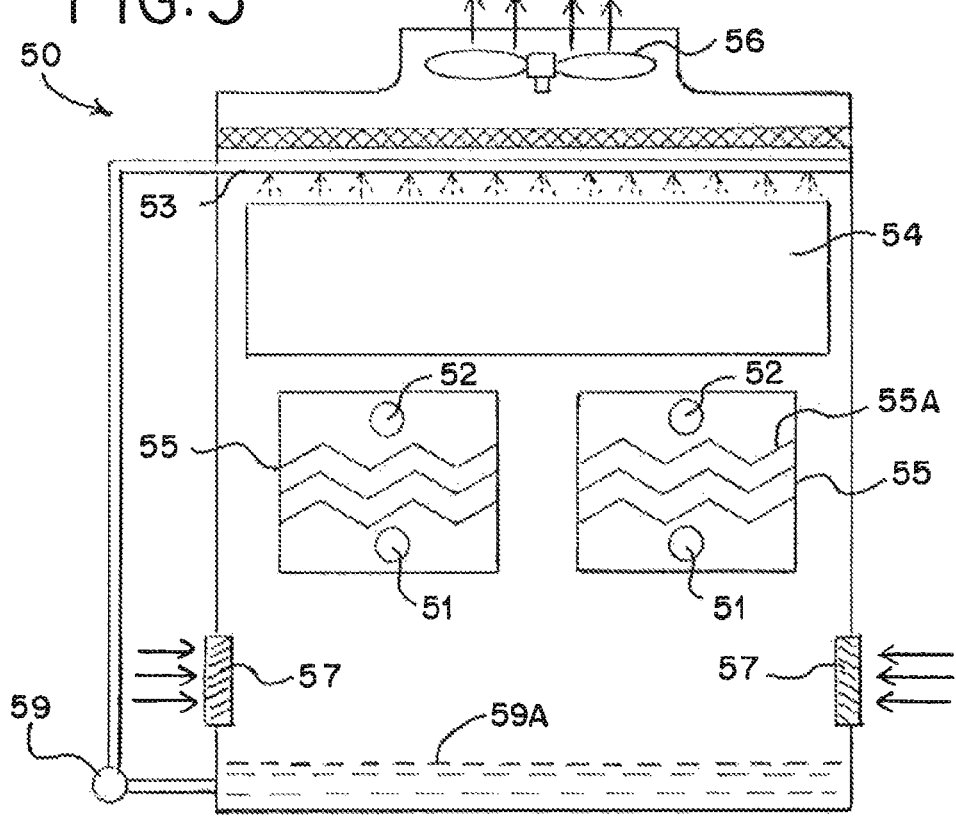
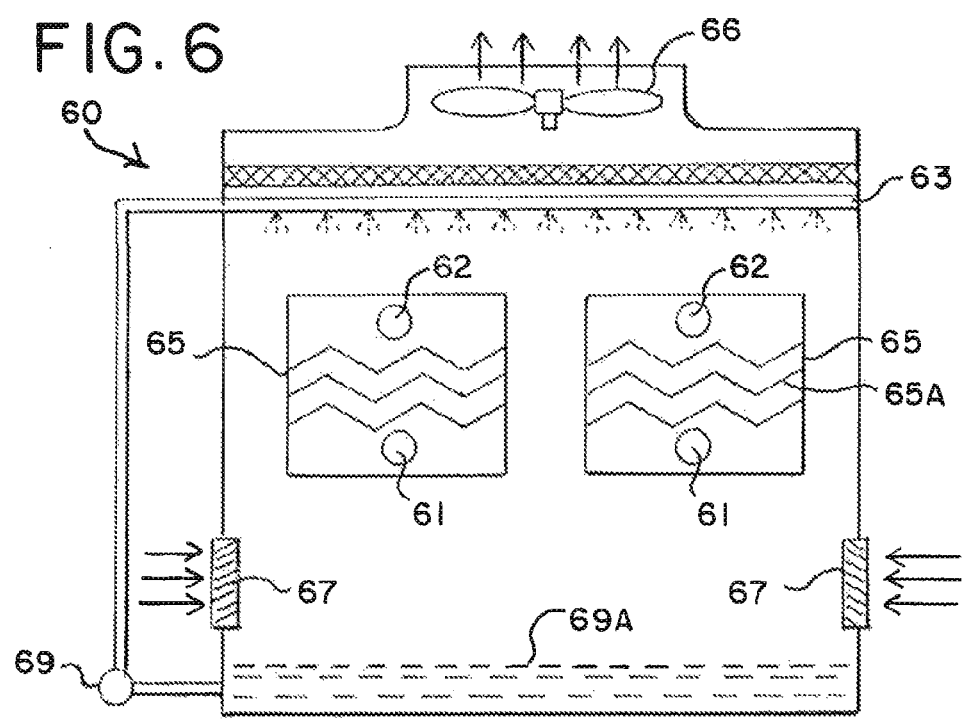

COOLING TOWER WITH INDIRECT HEAT EXCHANGER

BACKGROUND OF THE INVENTION

The present invention relates generally to an improved heat exchange apparatus such as a closed circuit fluid cooler, fluid heater, condenser, evaporator, thermal storage system, air cooler or air heater. More specifically, the present invention relates to a combination or combinations of separate indirect and direct evaporative heat exchange sections or components arranged to achieve improved capacity and performance.

The invention includes the use of a plate type heat exchanger as an indirect heat exchange section. When compared with coil circuit indirect heat exchangers which are comprised of individual circuits of tubing, the performance of an indirect heat exchange section comprised of a plate type heat exchanger is improved. Such indirect heat exchange section can be combined with a direct heat exchange section, which usually is comprised of a fill section over which an evaporative liquid such as water is transferred, usually in a downwardly streaming operation. Such combined indirect heat exchange section and direct heat exchange section together provide improved performance as an overall heat exchange apparatus such as a closed circuit fluid cooler, fluid heater, condenser, evaporator, air cooler or air heater.

Part of the improved performance of the indirect heat exchange section comprising a plate heat exchanger is the capability of the indirect heat exchange section as a plate type heat exchanger to provide both sensible and latent heat exchange with the evaporative liquid which is streamed or otherwise transported over and through the indirect heat exchange section. Another important improvement is that plate heat exchangers will have more surface area in the same physical space as other evaporative indirect heat exchangers. Such as indirect heat exchangers comprised, of serpentine coils.

Various combinations of the heat exchange arrangements are possible in accordance with the present invention. Such arrangements could include an arrangement wherein the indirect heat exchange section operates alone, is physically located above the direct heat exchange section or is physically located below the direct heat exchange section. In such an arrangement with indirect section located above the direct section, an evaporative liquid is streamed or otherwise sprayed downwardly onto the indirect heat exchange section with such evaporative liquid, which is usually water, then exiting the indirect section to be transported over the direct heat exchange section which is usually comprised of a fill arrangement. In another arrangement of a combined heat exchange apparatus the indirect heat exchange section is physically located below the direct heat exchange section. In another arrangement of a combined heat exchange apparatus two or more indirect sections are placed in a single closed circuit fluid cooler or heat exchanger each above or below a direct heat exchange section is also part of the present invention. Further, it should be understood that due to varying heat loads and needs of heat exchange, the heat exchanger apparatus or fluid cooler of the present invention could be operated wherein both air and an evaporative liquid such as water are drawn or supplied across both the indirect and direct heat exchange sections. It may be desirable to operate the heat exchanger without a supply of the evaporative liquid, wherein air only would be drawn across the indirect heat exchange section. It is also possible to operate a combined heat exchanger in accordance with the present invention wherein only evaporative liquid would be supplied across or downwardly through the indirect heat exchange section and the direct heat exchange section, and wherein air would not be drawn by typical means such as a fan.

In the operation of an indirect heat exchange section, a fluid stream passing through the internal openings in the plate type heat exchanger is cooled, heated, condensed, or evaporated in either or both a sensible heat exchange operation and a latent heat exchange operation by passing an evaporative liquid such as water together with air in passages between individual plate pairs or cassettes in the indirect heat exchanger. Such combined heat exchange results in a more efficient operation of the indirect heat exchange section. The evaporative liquid, which again is usually water, which passes across or downwardly through the indirect heat exchange section then passes, usually downwardly, across or through the direct heat exchange section which is typically a fill assembly. Heat in the evaporative liquid is passed to air which is drawn generally downwardly, upwardly or across the direct heat exchange section and outwardly from the closed circuit fluid cooler or heat exchanger assembly by an air moving system such as a fan. The evaporative liquid draining from the indirect or direct heat exchange section is typically collected in a sump and then pumped upwardly for redistribution across the indirect or direct evaporative heat exchange section. Of course, as explained above, the indirect and direct heat exchange sections can be reversed wherein, in the reversed situation where a direct heat exchange section would be located above an indirect heat exchange section, the evaporative fluid exiting the indirect section would be collected in a sump and pumped upwardly for distribution across the direct heat exchange section. Alternatively, only the indirect heat exchange section may be present.

Accordingly, it is an object of the present invention to provide an improved heat exchange apparatus, which could be a closed circuit fluid cooler, fluid heater, condenser, evaporator, air cooler or air heater, which includes an indirect heat exchange section and possibly a direct heat exchange section.

It is another object of the present invention to provide an improved heat exchange apparatus such as a closed circuit fluid cooler, fluid heater, condenser, evaporator, air cooler or air heater, including an indirect heat exchange section that comprises a plate type heat exchanger.

It is another object of the invention to provide an improved heat exchange apparatus comprising a plate type heat exchanger with more surface area per volume than other evaporative indirect heat exchangers.

SUMMARY OF THE INVENTION

The present invention provides an improved heat exchange apparatus which typically is comprised of a combination of an indirect heat exchange section and a direct heat exchange section. The indirect heat exchange section provides improved performance by utilizing a plate type heat exchanger as the indirect heat exchange section. The plate type heat exchanger contains more surface area per unit volume that other indirect evaporative heat exchangers. The plate type heat exchanger is comprised of one or more combined plate heat exchange groupings or cassettes each comprised of a pair of plates. Each cassette forms an internal passage between plates. Such plates are designed to allow a fluid stream to be passed there through within the cassette, exposing the fluid stream to a large surface area of one side of each plate in the cassette of the heat exchanger. Outside each plate a space is provided wherein air or an evaporative liquid such as water, or a combination of air and an evaporative liquid, can be passed to provide both sensible and latent heat exchange from the outside surfaces of the plates of the plate heat exchanger. Such utilization of a plate heat exchanger in the closed circuit fluid cooler, fluid heater, condenser, evaporator, air cooler or air heater of the present invention provides improved performance and also allows for combined operation or alternative operation wherein only air or only an evaporative liquid or a combination of the two can be passed through or across the outside of the plates in the plate heat exchanger.

A direct heat exchange section is located generally beneath the indirect heat exchange section whereby the evaporative liquid falling from the indirect heat exchange section is allowed to pass across or through fill and accordingly allow heat to be drawn from such evaporative liquid by a passage of air across or through the direct heat exchange section by air moving apparatus such as a fan. Such evaporative liquid is collected in a sump in the bottom of closed circuit fluid cooler, fluid heater, condenser, evaporator, air cooler or air heater and pumped back for distribution, usually downwardly, across or through the indirect heat exchange section.

It is also part of the present invention to provide an assembly wherein two or more indirect heat exchange sections are located above two or more direct heat exchange sections in a single cooling tower or heat exchanger unit. It is also part of the present invention to reverse the positioning of the indirect and direct heat exchange sections wherein the direct heat exchange section would be located above the indirect section. Accordingly an evaporative liquid would be passed initially downwardly through the direct heat exchange fill section, with the evaporative liquid falling from the direct heat exchange section to the indirect heat exchange section.

BRIEF DESCRIPTION OF THE DRAWINGS

In the drawings,

FIG. 1 is a side view of a first embodiment of a heat exchanger in accordance with the present invention;

FIG. 2 is a side view of a second embodiment of a heat exchanger in accordance with the present invention;

FIG. 5 is a side view of a fifth embodiment of a heat exchanger in accordance with the present invention;

FIG. 6 is a side view of a sixth embodiment of a heat exchanger in accordance with the present invention;

DESCRIPTION OF THE PREFERRED EMBODIMENT

Figure 1A:
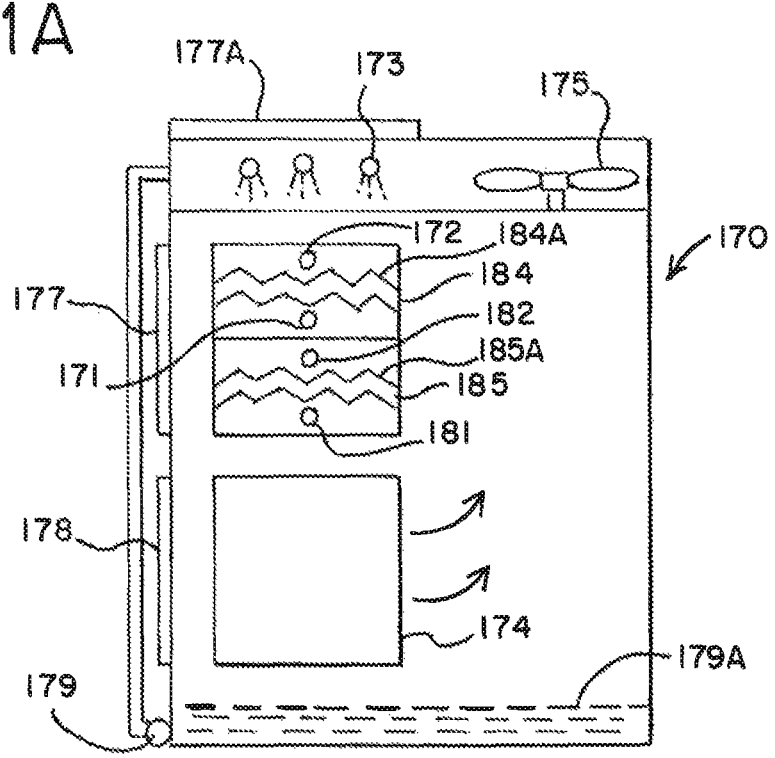
FIG. 1A is a side view of another embodiment of a heat exchanger in accordance with the present invention.

Referring now to FIG. 1 of the drawings, a heat exchanger in accordance with a first embodiment of the present invention is shown generally at 10. Such heat exchangers generally are present in a closed circuit cooling tower with a direct heat exchange section 4 and an indirect heat exchange section 5 located above direct heat exchange section 4. Direct heat exchange section 4 is typically comprised of fill usually comprised of sheets of polyvinyl chloride. Direct heat exchange section 4 receives air through air inlet 8 on the outside of heat exchanger 10, with air being drawn generally across and somewhat upwardly through direct heat exchange section 4 by fan 6. Indirect heat exchange section 5 is usually comprised of plate type heat exchanger 5A having a fluid outlet 2 and a fluid inlet 1. It should be understood that the operation of fluid outlet 2 and fluid inlet 1 can be reversed if it is desired. The preferred air direction through the indirect heat exchange section 5 is to enter from the top of the water distribution assembly 3. Air is then drawn generally downwardly from the top through the indirect heat exchanger section 5 and exits from the bottom of section 5 by fan 6. In addition, air can also be optionally drawn through air inlet 7 and generally downwardly across and upwardly through indirect heat exchange section 5 by fan 6 with the top of the water distribution assembly 7' open or closed. An evaporative liquid, usually water, flows downwardly from water distribution assembly 3 such that the evaporative liquid falls downwardly and through indirect heat exchange section 5. The evaporative liquid that passes through indirect heat exchange section 5 passes downwardly and through direct heat exchange section 4. The evaporative liquid that passes downwardly and out from direct heat exchange section 4 is collected in sump 9A and is pumped upwardly by pump 9 for redistribution through water distribution assembly 3. Water distribution assembly 3 can be comprised of a variety of pipes with openings, or any other water distribution arrangement such as using spray nozzles, troughs, or other water distribution assemblies. Indirect heat exchange section 5 is usually comprised of a plate type heat exchanger 5A. A fluid to be cooled, condensed, heated, or evaporated, passes within the joined plates or cassettes of plate heat exchanger 5A.

Referring now to FIG. 1A of the drawings, a heat exchanger in accordance with another embodiment of the present invention is shown generally at 170. Such heat exchangers generally are present in a closed circuit cooling tower with a direct heat exchange section 174 and two indirect heat exchange sections 184 and 185 located above direct heat exchange section 174. Direct heat exchange section 174 is typically comprised of fill usually comprised of sheets of polyvinyl chloride. Direct heat exchange section 174 receives air through air inlet 178 on the outside of heat exchanger 170, with air being drawn generally across and somewhat upwardly through direct heat exchange section 174 by fan 175. The first indirect heat exchange section 184 is usually comprised of plate type heat exchanger 184A having a fluid outlet 172 and a fluid inlet 171. The second indirect heat exchange section 185 is usually comprised of plate type heat exchanger 185A having a fluid outlet 182 and a fluid inlet 181. It should be understood that the operation of fluid outlets 172 and 182 and fluid inlets 171 and 181 can be reversed if it is desired. The preferred air direction through the indirect heat exchange sections 184 and 185 is to enter from the top of the water distribution assembly 173. Air is then drawn generally downwardly from the top through the indirect heat exchanger sections 184 and 185 and exits from the bottom of section 184 and 185 by fan 175. In addition, air can also be optionally drawn through air inlet 177 and generally downwardly across and upwardly through indirect heat exchange section 184 and 185 by fan 175 with the top of the water distribution assembly 177A open or closed. An evaporative liquid, usually water, flows downwardly from water distribution assembly 173 such that the evaporative liquid falls downwardly and through indirect heat exchange sections 184 and 185. The evaporative liquid that passes through indirect heat exchange sections 184 and 185 passes downwardly and through direct heat exchange section 174. The evaporative liquid that passes downwardly and out from direct heat exchange section 174 is collected in sump 179A and is pumped upwardly by pump 179 for redistribution through water distribution assembly 173. Water distribution assembly 173 can be comprised of a variety of pipes with openings, or any other water distribution arrangement such as using spray nozzles, troughs, or other water distribution assemblies. Indirect heat exchange sections 184 and 185 are usually comprised of a plate type heat exchanger 184 and 185A, respectively. Two fluids to be cooled, condensed, heated, or evaporated, pass independently within the joined plates or cassettes of plate heat exchanger 184 and 185A as separate fluid streams.

FIG. 2 is a side view of the second embodiment of heat exchanger 20 in accordance with a second embodiment of the present invention. Heat exchanger 20 is usually a closed circuit cooling tower including an indirect heat exchange section 15 located above a direct heat exchange section 14, with the understanding that two such indirect and direct sections are provided as part of heat exchanger 20. Direct heat exchange section 14 is again comprised of fill sheets of a suitable material such as polyvinyl chloride. Air to be passed across and generally crossways through direct heat exchange section 14 enters through air inlet 18 and is drawn by fan 16. Indirect heat exchange section 15 is usually comprised of a plate heat exchanger 15A. The preferred air direction through the indirect heat exchange section 15 is to enter from the top of the evaporative liquid distribution arrangement 13A. Air is then drawn generally downwardly from the top through the indirect heat exchanger section 15 and exits from the bottom of section 15 by fan 16. In addition, air can also be optionally drawn downwardly, across and generally upwardly through indirect heat exchange section 15 entering through air inlet 17 by fan 16 with the top of the liquid distribution arrangement 17' open or closed. Evaporative liquid is provided to flow downwardly from an evaporative liquid distribution arrangement 13A. Such evaporative liquid passes generally downwardly across indirect heat exchange section 15. The evaporative liquid that exits indirect heat exchange section 15 passes downwardly through direct heat exchange section 14 and is collected in sump 19A. Such collected evaporative liquid is pumped by pump 19 upwardly for distribution to water evaporative liquid distribution assembly 13A. Plate heat exchanger 15A includes fluid outlet 12 and fluid inlet 13, which can be reversed if it is desired. A fluid to be cooled, condensed, heated or evaporated passes within the joined plates or cassettes of plate heat exchanger 15A.

It should be understood in the operation of heat exchanger 10 and heat exchanger 20 described above, that depending on the performance required, both such heat exchangers may be operated with both evaporative liquid exiting the evaporative liquid distribution system and the fan drawing air across and through the direct and indirect heat exchange sections. If a lesser degree of heat exchange is required, it is possible to operate without the fan drawing air across the indirect and direct sections, such that only the evaporative liquid would exit and pass downwardly and through the indirect and direct heat exchange sections. Finally, the unit may be operated such that the evaporative liquid would not be supplied through the evaporative liquid distribution assembly, and the heat exchanger would operate only with the fluid passing within the indirect heat exchange section joined plate pairs being cooled by air passing downwardly or across and upwardly drawn by the fan in the heat exchanger or cooling tower.

Figure 3:
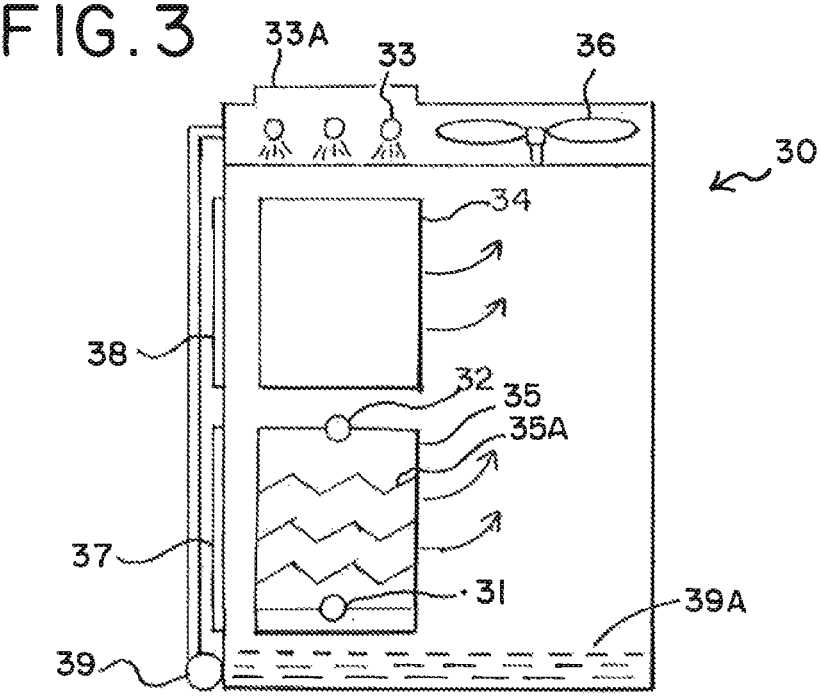
FIG. 3 is a side view of a third embodiment of a heat exchanger in accordance with the present invention.

Referring now to FIG. 3 of the drawings, the third embodiment of a heat exchanger is shown generally at 30, in the form of a closed circuit cooling tower. Heat exchanger 30 is comprised of a direct heat exchange section 34 which is located generally above an indirect heat exchange section 35. Direct heat exchange section 34 is usually comprised of a fill sheet assembly wherein the fill sheets are typically comprised of polyvinyl chloride. Air enters through air inlet 38 and is drawn by fan 36 across and upwardly through direct heat exchange section 34. An evaporative liquid usually water is distributed downwardly from evaporative liquid distribution assembly 33; such evaporative liquid passes downwardly and through direct heat exchange section 34. The top 33A of the evaporative liquid distribution assembly 33, is usually closed. Indirect heat exchange section 35 is usually comprised of a plate heat exchanger 35A which is comprised of a series of joined plate cassettes with separated spaces between each cassette. Fluid to be cooled, heated, condensed or evaporated enters through fluid inlet 31 and exits through fluid outlet 32, although such can be reversed if it is desired. Air passes through the indirect heat exchange section 35 and between plate pairs or cassettes of the plate heat exchanger entering through air inlet 37 and drawn by fan 36. Note that air inlet 38 can be partially open to change the air flow ratio between the indirect and the direct heat exchange sections or can be fully closed which allows the full amount of air entering the direct heat exchange section. Evaporative liquid falling from direct heat exchange section 34 passes between the plate pairs or cassettes of plate heat exchanger 35 and provides both sensible and latent heat transfer of the fluid passing within the joined plates in plate heat exchanger 35A. Such evaporative liquid is collected in sump 39A and is pumped upwardly through using pump 39 for redistribution through evaporative distribution assembly 33.

Figure 4:
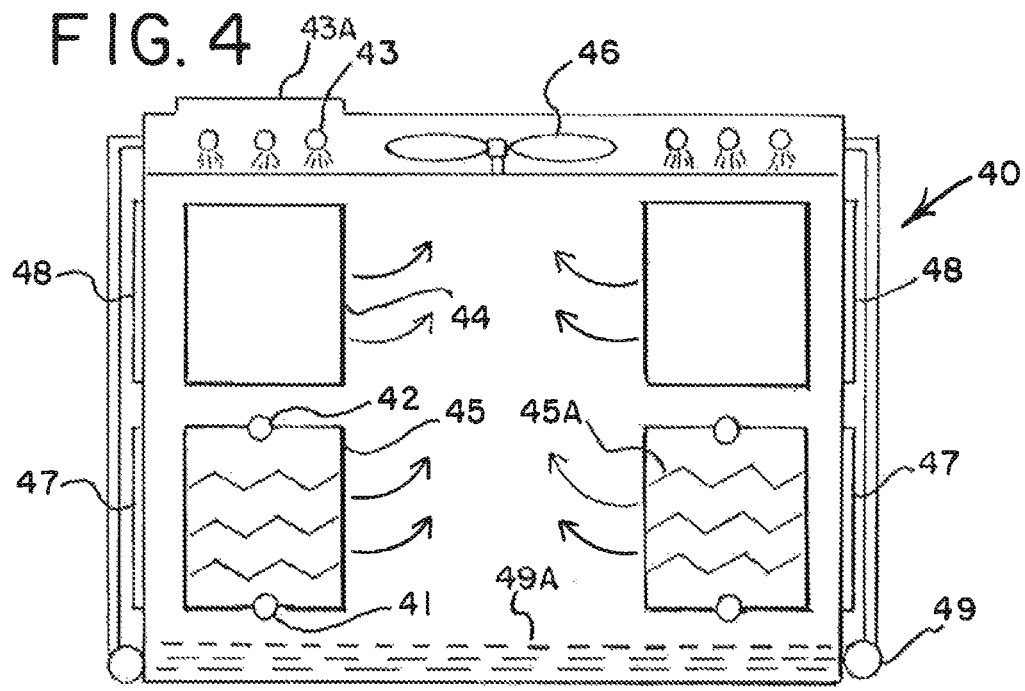
FIG. 4 is side view of a fourth embodiment of a heat exchanger in accordance with the present invention.

Referring now to FIG. 4, a fourth embodiment of a heat exchanger assembly is shown generally at 40 in accordance with the present invention. In this embodiment two direct heat exchanger sections 44 are located above two indirect heat exchanger sections 45. Evaporative liquid exits evaporative liquid distribution assembly 43 and is distributed downwardly through direct heat exchange section 44 which is usually comprised of a series of fill sheets made of polyvinyl chloride. The top 43A of the evaporative liquid distribution assembly 43, is usually closed. Air passed across and generally upwardly through direct heat exchange section 44 entering through air inlet 48 and with air drawn by fan 46. Note that air inlet 48 can be partially open to change the air flow ratio between the indirect and the direct heat exchange sections or can be fully closed which allows the full amount of air entering the direct heat exchange section. Indirect heat exchange section 45 is usually comprised of a series of plate heat exchangers 45A. Such plate heat exchangers allow a fluid to be passed through the joined plates or cassettes thereby exposing such fluid to a large surface area of the plates themselves. Such plates are usually arranged such that a space between each joined plate pair or cassette is provided for the evaporative liquid to be passed there through, currently with air, to allow both sensible and latent heat transfer of the evaporative liquid passing between the plates. Further air enters and passes across and upwardly through the plate heat exchanger 45. Air is drawn through air inlet 47 and outwardly by fan 46. Evaporative liquid passing downwardly through indirect heat exchange section 45 is collected in sump 49A and is pumped upwardly by pump 49 to be distributed again through evaporative liquid distribution assembly 43.

It should be understood in the operation of heat exchanger 30 and heat exchanger 40 described above, that depending on the performance required, both such heat exchangers may be operated with both evaporative liquid exiting the evaporative liquid distribution system and the fan drawing air across and through the direct and heat exchange sections. It is possible to operate without the fan drawing air across the indirect and direct sections, such that only the evaporative liquid would exit and pass downwardly and through the indirect and direct heat exchange sections. Finally, it is possible that the evaporative liquid would not be supplied through the evaporative liquid distribution assembly, and the heat exchanger would operate only with the fluid passing through the indirect heat exchange section joined plate pairs or cassettes being cooled, heated, condensed, or evaporated by air passing across and upwardly there through drawn by the fan in the heat exchanger or cooling tower.

Referring now to FIG. 5, a fifth embodiment of the present invention is shown as a heat exchanger in a closed circuit cooling tower assembly 50. Such heat exchanger is shown to be comprised of a direct heat exchange section 54 located generally above two indirect heat exchange sections 55. Direct heat exchange section 54 is usually comprised of a series of fill sheets with each fill sheet being comprised of polyvinyl chloride. Each indirect heat exchange section is comprised of a plate heat exchanger arrangement having a fluid outlet 52 and a fluid inlet 51, which can be reversed if it is desired. Air is drawn inwardly through air inlets 57 by fan 56. Evaporative liquid passes from evaporative distribution assembly 53 downwardly and through direct heat exchange section 54. Evaporative liquid passing through direct heat exchange section 54 passes downwardly through both indirect heat exchange sections 55. Evaporative liquid passing from indirect heat exchange sections 55 is collected in sump 59A, and is pumped upwardly by pump 59 for distribution through evaporative liquid distribution assembly 53. Indirect heat exchange section 55 is comprised of a collection of joined plate pairs or cassettes 55A. Each plate pair is separated such that evaporative liquid passing downwardly through indirect heat exchange section 55 can draw heat from the fluid within plate pairs 55A sensibly by contact with the outside of the plates. All of the heat is eventually released to the air from the evaporative fluid in both latent and sensible fashions in the evaporative passage.

It should be understood in the operation of heat exchanger 50 described above, that depending on the performance required, such heat exchanger may be operated with both evaporative liquid exiting the evaporative liquid distribution system and the fan drawing air across and through the direct and indirect heat exchange sections. It is possible to operate without the fan drawing air across the indirect and direct sections, such that only the evaporative liquid would exit and pass downwardly and through the indirect and direct heat exchange sections. Finally, it is possible again that the evaporative liquid would not be supplied through the evaporative liquid distribution assembly, and the heat exchanger would operate only with the fluid passing through the indirect heat exchange section plates being cooled, heated, condensed, or evaporated by air passing across and upwardly there through drawn by the fan in the heat exchanger or cooling tower.

Referring now to FIG. 6, a sixth embodiment of the present invention is shown generally as heat exchanger 60, which is usually a closed circuit cooling tower. Heat exchanger or cooling tower 60 is seen to be comprised of indirect heat exchange sections 65. Each indirect heat exchange section 65 is seen to be usually comprised of plate heat exchangers 65A, which are present as assemblies. Indirect heat exchange section 65 has a fluid outlet 61 and a fluid inlet 62, which can be reversed if it is desired. An evaporative liquid, usually water, is discharged from evaporative liquid distribution assembly 63 generally downwardly such that evaporative liquid passes downwardly and through indirect heat exchange section 65. Air is seen to be drawn inwardly through air inlets 67 generally upwardly through indirect heat exchange section 65 by fan 66. Further, evaporative liquid that passes through indirect heat exchange section 65 is collected in sump 69A and is pumped upwardly by pump 69 for redistribution through evaporative liquid distribution assembly 63. Evaporative liquid 63 that passes through plate heat exchanger 65 absorbs heat by contacting the large plate surface of plate heat exchanger 65A to absorb heat from the fluid within plate pairs 65A in a sensible fashion. All of the heat is eventually released to the air from the evaporative fluid in both latent and sensible fashions in the evaporative passage.

It should be understood in the operation of heat exchanger 60 described above, that depending on the performance required, such heat exchanger may be operated with both evaporative liquid exiting the evaporative liquid distribution system and the fan drawing air up and through the indirect heat exchange sections. If a lesser degree of heat exchange is required, it is possible to operate without the fan drawing air up and through the indirect section, such that only the evaporative liquid would exit and pass downwardly and through the indirect section. Further, if the evaporative liquid would not be supplied through the evaporative liquid distribution assembly, and the heat exchanger would operate only with the fluid passing through the indirect heat exchange section plates being cooled, heated, condensed, or evaporated by air passing up and upwardly there through drawn by the fan in the heat exchanger or cooling tower. Further, the heat exchanger may be operated with the fan drawing air up and through one of the two indirect sections, with or without the evaporative liquid being supplied.

Figure 7:
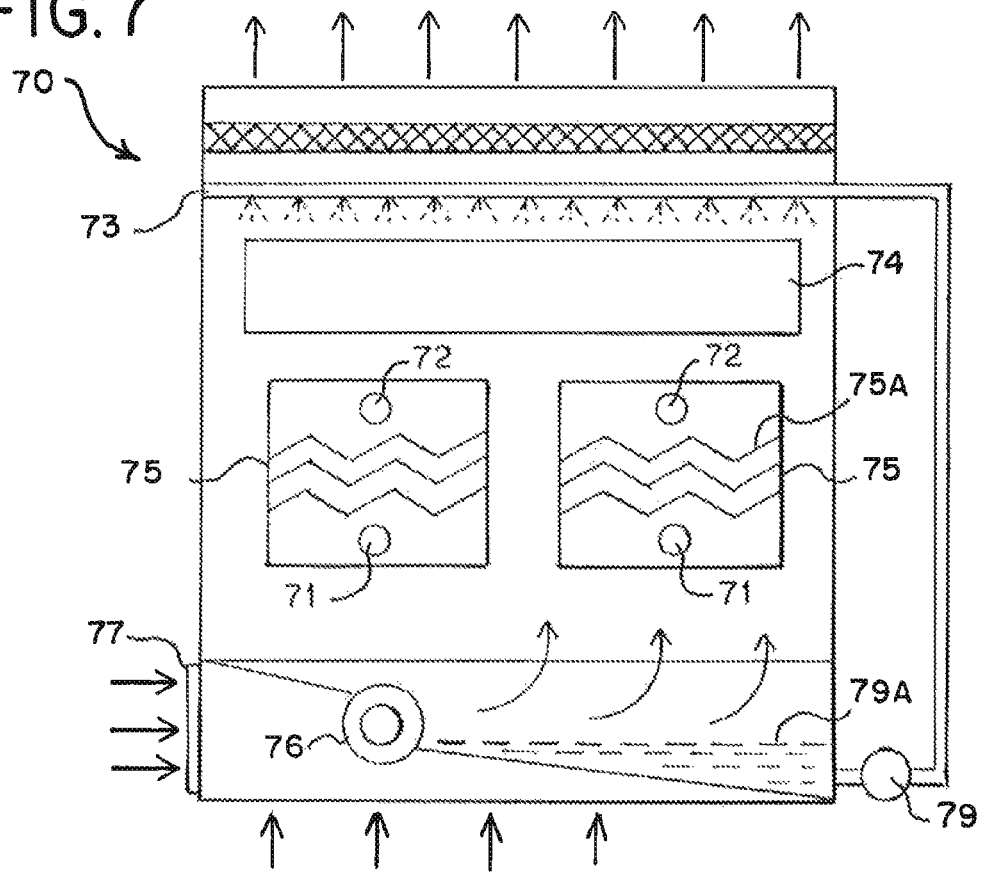
FIG. 7 is a side view of a seventh embodiment of a heat exchanger in accordance with the present invention.

Referring now to FIG. 7, a seventh embodiment of the present invention is shown generally as heat exchanger 70, which is generally in the form of a closed circuit cooling tower. Heat exchanger 70 is seen to be comprised of a direct heat exchange section 74 for above two indirect heat exchange sections 75. Direct heat exchange section 74 is usually comprised of a series of fill sheets each comprised of polyvinyl chloride. Each indirect heat exchange section 75 is seen to be comprised of a series of joined plates or cassettes 75A with fluid outlet 72 and fluid inlet 71. These fluid inlet and outlet can be reversed if it is desired. Evaporative liquid is discharged from evaporative distribution assembly 73 downwardly onto and through direct heat exchange section 74. Evaporative liquid that passes through direct heat exchange section 74 passes downwardly and through indirect heat exchange sections 75. Evaporative liquid that passes through and out of indirect heat exchange sections 75 is collected in sump 79A and pumped upwardly by pump 79 for distribution through evaporative liquid distribution assembly 73. Air enters heat exchanger 70 through air inlet 77 and is drawn inwardly by centrifugal fan 76 and pushed upwardly, or in a counter flow direction, with respect to the evaporative liquid, through indirect heat exchange section 75 and direct heat exchange section 74. Evaporative liquid that passes through indirect heat exchange section 75 passes between the joined plates or cassettes of plate heat exchangers 75A thereby providing cooling, heating, evaporating, or condensing to the fluid passing through the joined plate pairs of plate heat exchangers 75A. Further, the evaporative liquid passes downwardly through indirect heat exchange section 75 passes between the joined plates of plate heat exchanger 75A along with air to thereby allow both sensible and latent heat exchanges of the fluid passing through the joined plate pairs of heat exchanger 75A.

It should be understood in the operation of heat exchanger 70 described above, that such heat exchanger may be operated with both evaporative liquid exiting the evaporative liquid distribution system and the fan drawing air up and through the direct and indirect heat exchange sections. It is possible to operate without the fan drawing air up and through the indirect and direct sections, such that only the evaporative liquid would exit and pass downwardly and through the indirect and direct heat exchange sections. Finally, it is possible again that the evaporative liquid would not be supplied through the evaporative liquid distribution assembly, and the heat exchanger would operate only with the fluid passing through the indirect heat exchange section plates being cooled, heated, condensed, or evaporated by air passing upwardly there through drawn by the fan in the heat exchanger or cooling tower.

Figure 8:
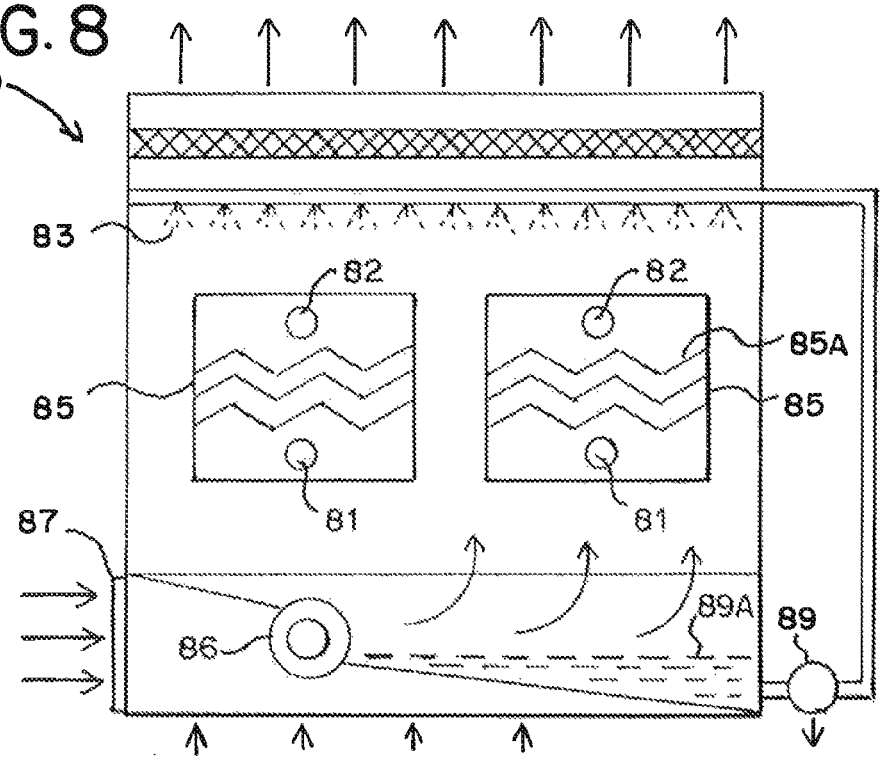
FIG. 8 is a side view of an eighth embodiment of a heat exchanger in accordance with the present invention.

Referring now to FIG. 8, an eighth embodiment of the heat exchanger in accordance with the present invention is shown generally at 80 which is shown in the form of heat exchanger or closed circuit cooling tower. Heat exchanger 80 is seen to be comprised of a pair of indirect heat exchange sections 85. Each indirect heat exchange section 85 is comprised of a series of joined plates or cassettes 85A. Indirect heat exchange section 85 also includes a fluid outlet 81 and a fluid inlet 82, which can be reversed as it is desired. Evaporative liquid is provided by evaporative liquid distribution assembly 83 to pass downwardly and through each indirect heat exchange section 85. Such evaporative liquid that passes through indirect heat exchange sections 85 is collected in sump 89A and is pumped upwardly by pump 89 back to evaporative liquid distribution assembly 83. Air that is drawn in air inlet 87 by centrifugal fan 86 passes generally upwardly or in a counter flow direction through indirect heat exchange sections 85. Evaporative liquid that passes through heat exchange section 85 passes between the joined plate pairs or cassettes of plate heat exchanger 85A such that the fluid passing through the joined plates of exchanger 85A is cooled, heated, condensed, or evaporated both sensibly and in a latent manner by such evaporative liquid passing downwardly over the outer surface area of the joined plates of plate heat exchanger 85A along with air.

It should be understood in the operation of heat exchanger 80 described above, that such heat exchanger may be operated with both evaporative liquid exiting the evaporative liquid distribution system and the fan drawing air up and through the indirect heat exchange section. It is possible to operate without the fan pushing air up and through the indirect section, such that only the evaporative liquid would exit and pass downwardly and through the indirect heat exchange section. Finally, it is possible again that the evaporative liquid would not be supplied through the evaporative liquid distribution assembly, and the heat exchanger would operate only with the fluid passing through the indirect heat exchange section plates being cooled, heated, condensed, or evaporated by air passing upwardly there through pushed by the fan in the heat exchanger or closed circuit cooling tower.

Figure 9:
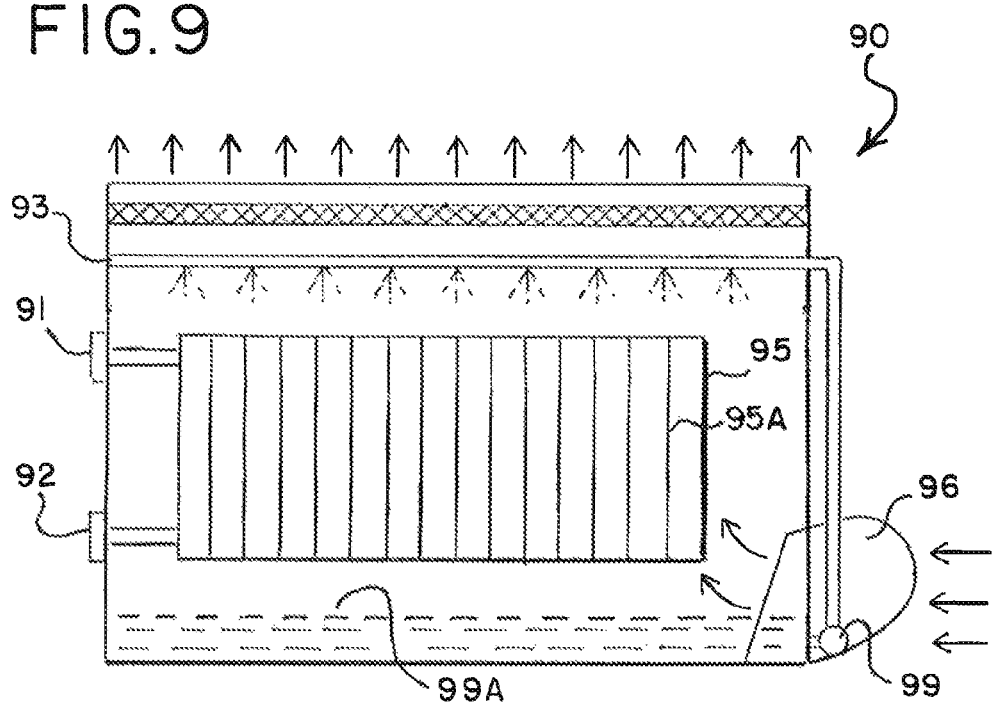
FIG. 9 is a side view of a ninth embodiment of a heat exchanger in accordance with the present invention.

Referring now to FIG. 9, a ninth embodiment of the present invention is shown generally at 90 as a heat exchanger or a closed circuit cooling tower. Heat exchanger 90 is seen to be comprised of an indirect sections 95. Indirect heat exchange section 95 is seen to be comprised of a series of joined plates or cassettes 95A with fluid outlet 92 and fluid inlet 91. It should be understood that fluid outlet and fluid inlet 92 and 91 can be reversed if it is desired. As the embodiment shown in FIG. 9 of heat exchanger 90 is generally of a low profile arrangement, centrifugal fan 96 is seen to be located outside the structure of heat exchanger 90 to thereby draw air inwardly through the fan structure to be passed generally upwardly through and across indirect heat exchange section 95. Evaporative liquid is distributed downwardly from evaporative liquid distribution assembly 93 to pass downwardly through indirect heat exchange section 95. Such evaporative liquid that passes out from indirect heat exchange assembly 95 is collected in sump 99A and is pumped upwardly by pump 99 for redistribution through evaporative liquid distribution assembly 93. Evaporative liquid that passes through heat exchange section 95 passes between the joined plate pairs or cassettes of plate heat exchanger 95A such that the fluid passing through inside of the joined plates of exchanger 95A is cooled, heated, condensed, or evaporated both sensibly and in a latent manner by such evaporative liquid passing downwardly over the outer surface area of the joined plates of plate heat exchanger 95A along with air.

It should be understood in the operation of heat exchanger 90 described above, that such heat exchanger may be operated with both evaporative liquid exiting the evaporative liquid distribution system and the fan pushing air up and through the indirect heat exchange section. It is possible to operate without the fan pushing air up and through the indirect section, such that only the evaporative liquid would exit and pass downwardly and through the indirect heat exchange section. Finally, it is possible again that the evaporative liquid would not be supplied through the evaporative liquid distribution assembly, and the heat exchanger would operate only with the fluid passing through the indirect heat exchange section plates being cooled, heated, condensed, or evaporated by air passing upwardly there through pushed by the fan in the heat exchanger or cooling tower.

Figure 10:
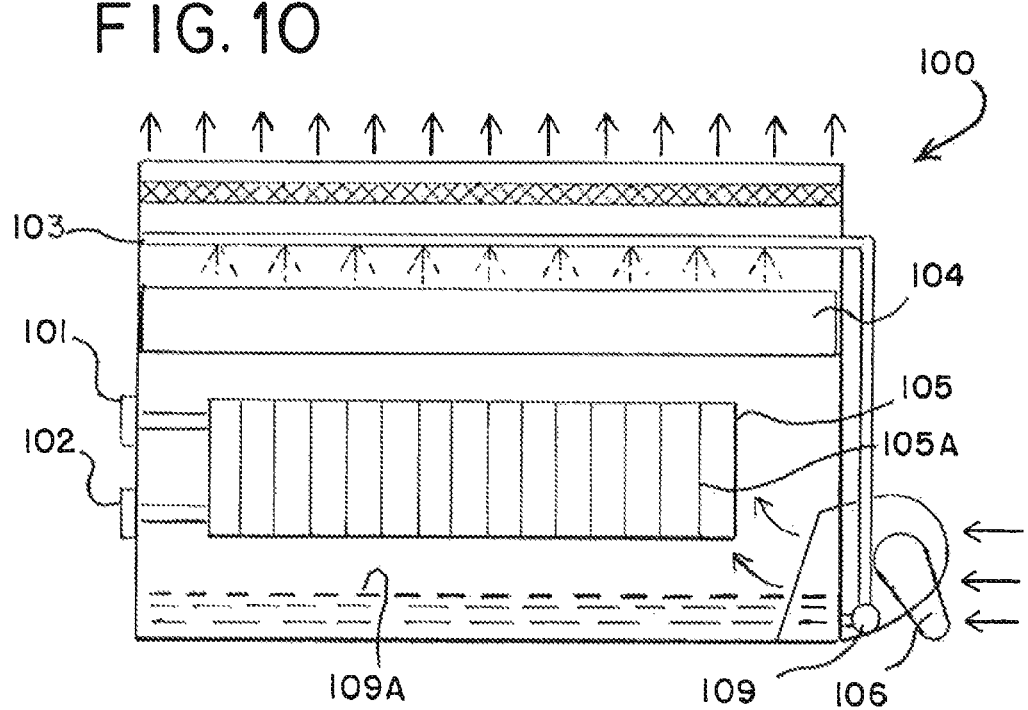
FIG. 10 is a side view of a tenth embodiment of a heat exchanger in accordance with the present invention.

Referring now to FIG. 10, a tenth embodiment of the present invention is shown generally as a heat exchanger 100 or in the form of a closed circuit cooling tower. Heat exchanger 100 is seen to be comprised of an indirect heat exchange section 105 located generally below a direct heat exchange section 104. Direct heat exchange section 104 is usually comprised of a series of fill sheets each comprised of a polyvinyl chloride. Indirect heat exchange section 105 is usually comprised of a series of plate heat exchanger pairs or cassettes 105A, having a fluid outlet 101 and a fluid inlet 102. If it desired, such fluid inlet and outlet can be reversed. Air is seen to be drawn inwardly by fan 106 which is located outside the physical structure or attached to the outside of the physical structure of heat exchanger 100. This is usually centrifugal fan 106 which brings air inwardly near the side or bottom of heat exchanger 100 and near one end thereof such air is forced upwardly through and across indirect heat exchange section 105 and generally upwardly in a counter-flow direction, with respect to the evaporative liquid, through direct heat exchange section 104. Evaporative liquid is distributed downwardly from evaporative liquid distribution assembly 103. Such evaporative liquid passes downwardly through direct heat exchange section 104. The evaporative liquid that exits direct heat exchange section 104 passes downwardly through indirect heat exchange section 105 and is collected in a sump 109A. Such collected evaporative liquid is pumped from sump 109A by pump 109 back to water distribution assembly 103. Plate heat exchanger pairs or cassettes 105A are typically spaced from each other such that the fluid passing inside the plates of plate heat exchanger 105 is cooled, heated, condensed, and evaporated both sensibly and in a latent manner by the evaporative liquid passing on the outside of the plate pairs of plate heat exchanger 105 and also by the air being drawn by a counter-current manner across and generally upwardly through indirect heat exchange section 105.

It should be understood in the operation of heat exchanger 100 described above, that such heat exchanger may be operated with both evaporative liquid exiting the evaporative liquid distribution system and the fan forcing air up and through the direct and indirect heat exchange sections. It is possible to operate without the fan forcing air up and through the indirect and direct sections, such that only the evaporative liquid would exit and pass downwardly and through the indirect and direct heat exchange sections. Finally, it is possible again that the evaporative liquid would not be supplied through the evaporative liquid distribution assembly, and the heat exchanger would operate only with the fluid passing through the indirect heat exchange section plates being cooled, heated, condensed, or evaporated by air passing across and upwardly there through forced by the fan in the heat exchanger or cooling tower.

Figure 11:
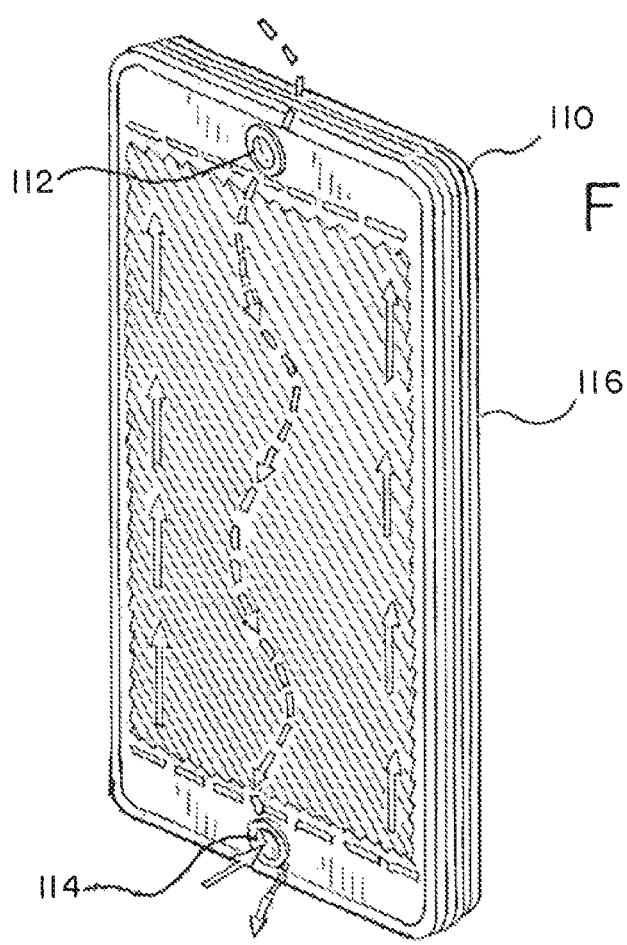
FIG. 11 is a perspective view of a plate heat exchanger in accordance with an embodiment of the present invention.
Figure 12:
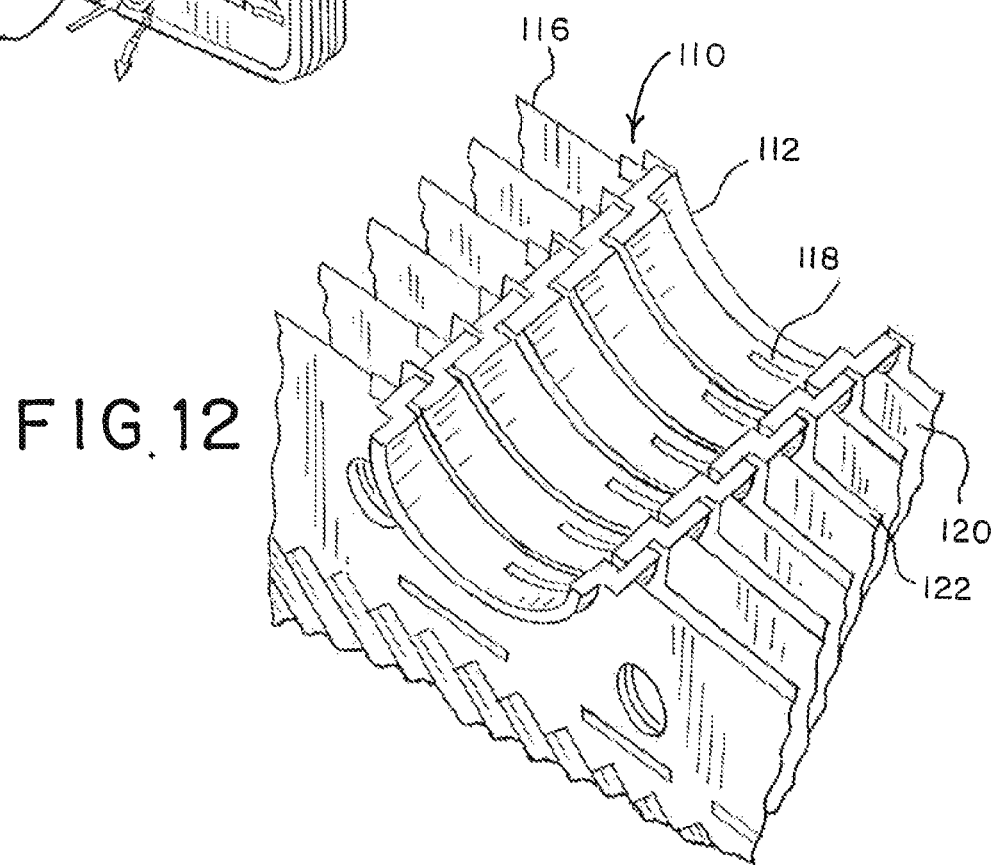
FIG. 12 is a partial view of a plate heat exchanger in accordance with an embodiment of the present invention.

Referring now to FIGS. 11 and 12, a view of a plate heat exchanger in accordance with the present invention is shown generally at 110. Each plate heat exchanger is shown to be comprised of a series of joined pairs or cassettes of plates 116 spaced from each other. A fluid outlet header is shown at 112 and a fluid inlet header is shown at 114. As shown in FIG. 12, in a detailed breakaway view, fluid outlet header 112 is seen to include openings 118 such that fluid to be cooled, heated, evaporated or condensed may exit from within each plate pair 116. Further passageways 120 are shown between plates 116 such that evaporative liquid and air can pass on the outside of plates 116 to provide both sensible and latent heat transfer to the fluid passing within joined plate or cassettes 116 of plate heat exchanger 110. Each plate cassette 116 is seen to include an internal fluid passageway 122 that allows fluid to be cooled, heated, condensed, or evaporated to enter through fluid inlet header 114, pass through the interior of joined plate pairs or cassettes 116 and exit through openings 118 in each plate pair to enter outlet header 112. Such plate heat exchanger assembly 110 is seen to include usually a Chevron, embossing, cross hatch, dimpled, micro structurally extended, or any other surface enhancement pattern on both sides of each cassette assembly 116 to provide increased surface area and turbulent flow to allow improved performance and heat exchange between the fluid within the each cassette 116 and the air and evaporative liquid passing on the outside surface of each cassette 116. The geometries of the surface enhancement pattern on the plate are strategically selected such that the passageway formed in the space between each cassette assembly 116 allows good heat and mass transfer between the air and the evaporative liquid which pass concurrently between each cassette 116. This external passageway is usually, but not limited to, a general criss-cross pattern formed as the chevron patterns from adjacent cassettes approach close to, or even contacting, each other. Such arrangement leads to the overall improved performance in all the embodiments of the heat exchanger of the present invention that include an indirect heat exchange section. The surface pattern could be different on each side of the plate. The plate surface could be chemically treated (i.e., nano spray coated) to achieve an optimized surface tension value and thus enhance the air and evaporative liquid interaction.

Figure 13:
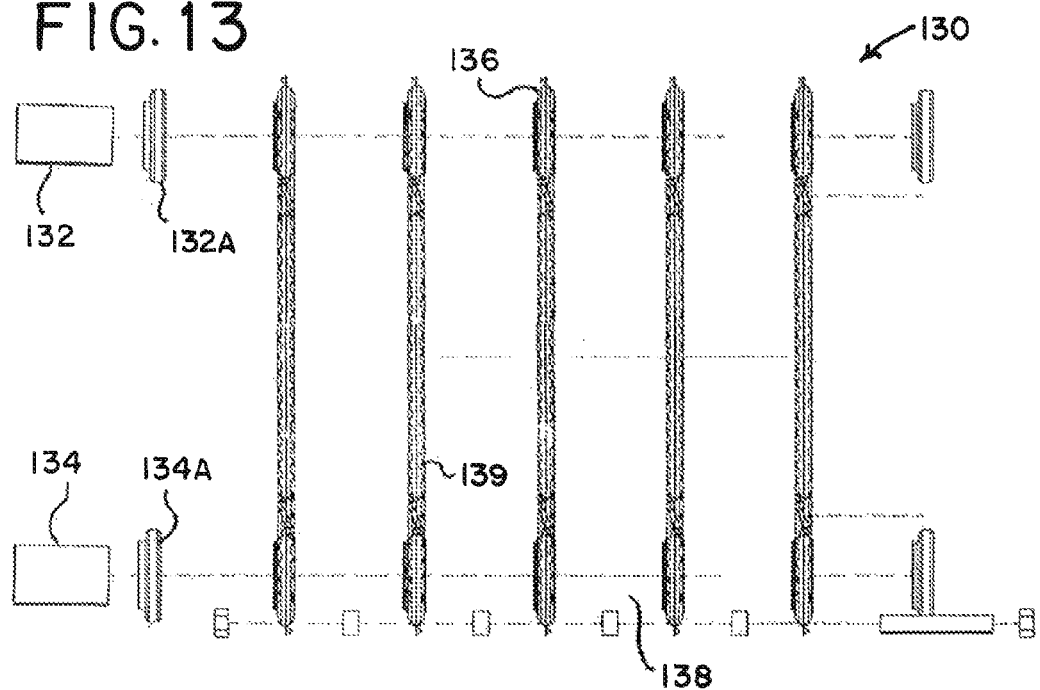
FIG. 13 is a side view of a plate heat exchanger with plates separated in accordance with the present invention.

Referring now to FIG. 13, a plate heat exchanger in accordance with the present invention is shown generally at 130. Each such plate heat exchanger is seen to be comprised of a series of adjacent plate pairs or cassettes 136. Each plate cassette 136 has an internal spacing within to allow a fluid to enter through fluid inlet header 134 pass within each plate cassette 136 and exit through fluid outlet header 132. Each inlet header includes a spacer ring 134A to allow header 134 to be affixed to the series of plate cassettes 136, and an outlet header spacer ring 132A to allow fluid outlet header 132 to be attached to the series of plate cassettes 136. Further, spacing 138 is seen in an exploded arrangement to exist between each plate cassette 136 to provide an adequate passageway for evaporative liquid to pass in a cross-current, parallel-current, counter-current or some combination thereof arrangement with assembled plates 136. Such spacing also allows for air to pass between such plates such air usually being drawn in a cross-current, counter-current, parallel-current fashion or some combination thereof arrangement by fans within the heat exchanger. Such spacing between plate cassettes allows for increased performance of the indirect heat exchange section comprised of plate heat exchanger 130 by allowing both sensible and latent heat exchange to occur between the fluid within each plate pair or cassette 136 and the evaporative liquid and air passing in the passageway between such plate pair or cassettes 136. The internal passage within each plate cassette is labeled 139.

Figure 14:
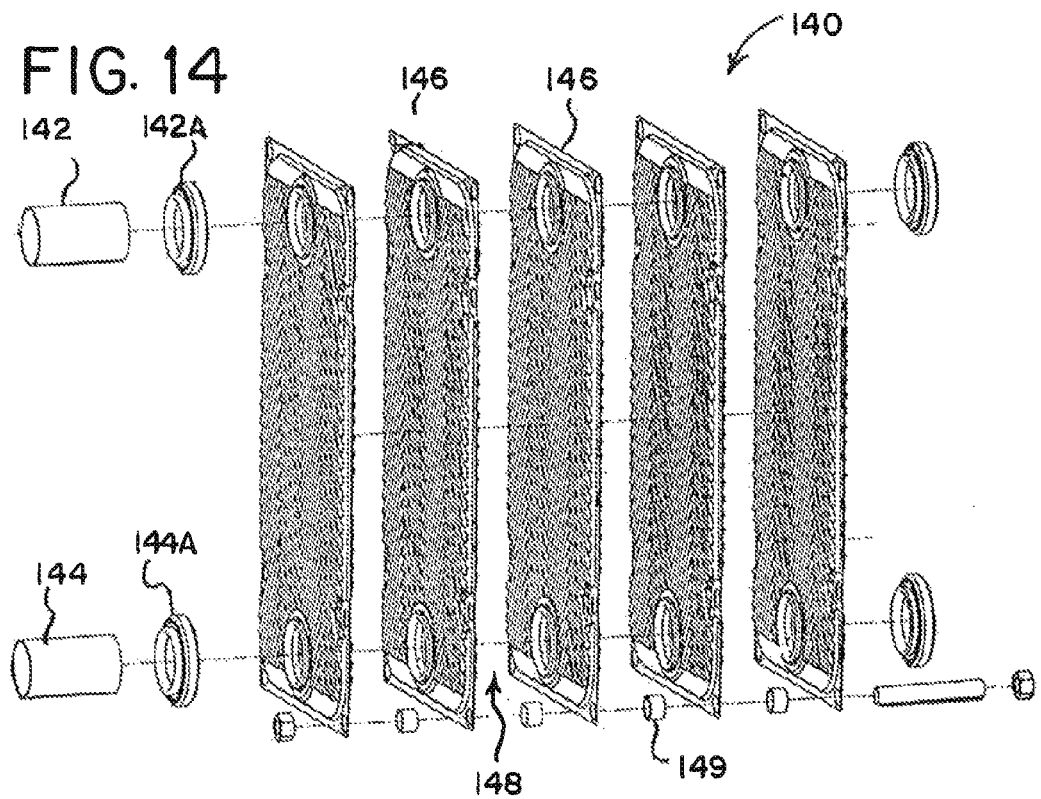
FIG. 14 is a side view of a plate heat exchanger showing places separated in accordance with the present invention.
Figure 15:
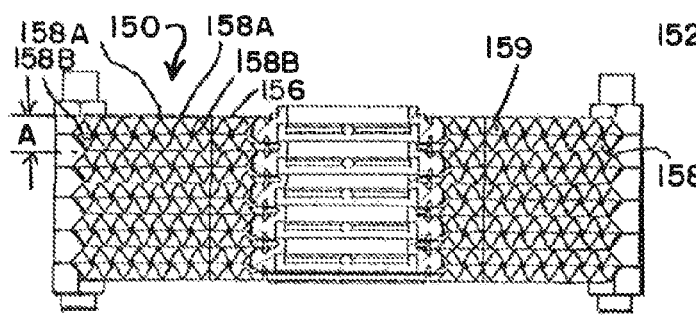
FIG. 15 is a top view of a plate heat exchanger in accordance with the present invention.
Figure 16:
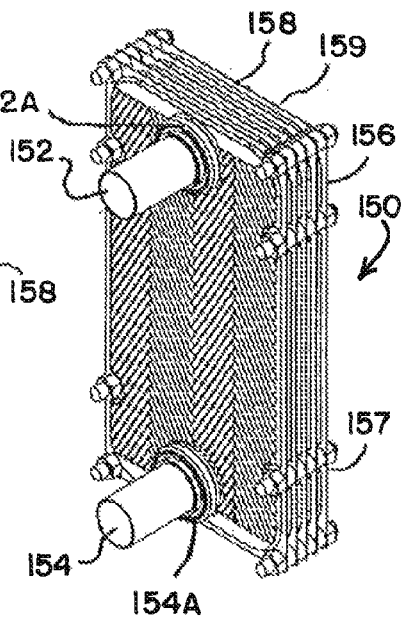
FIG. 16 is a perspective view of an assembled plate heat exchanger in accordance with the present invention.
Figure 17:
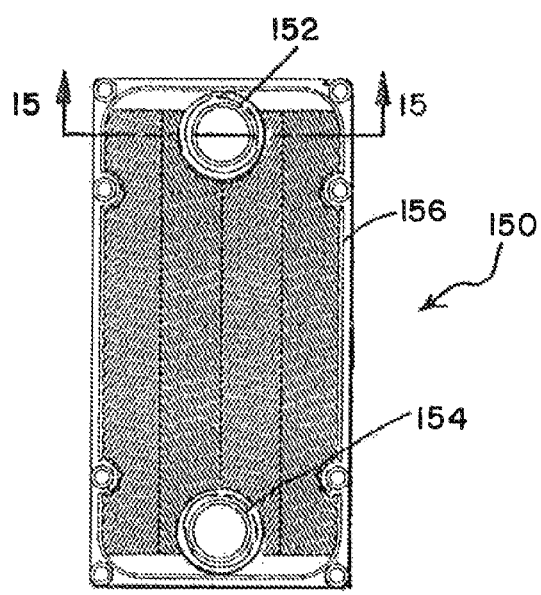
FIG. 17 is an end view of a plate heat exchanger in accordance with the present invention.
Figure 18:
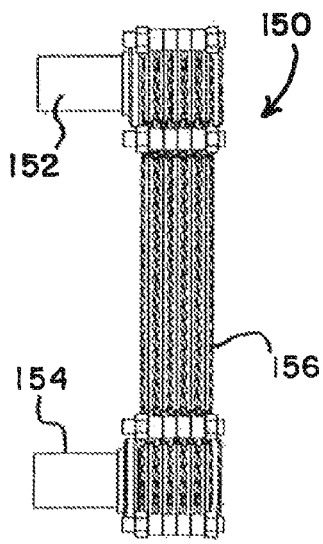
FIG. 18 is a side view of a plate heat exchanger in accordance with the present invention.

Referring now to FIG. 14, a perspective view of a plate heat exchanger assembly 140 is shown. Plate heat exchanger assembly 140 is seen to be comprised of a series of plate cassettes 146 each of which includes an internal passageway to allow fluid to pass therein. Each plate cassette is seen to ideally be comprised of a chevron or other surface arrangement to provide increased surface area of each plate pair. Plate heat exchanger assembly 140 is seen to also comprise a fluid outlet header 142 connected to the series of plate cassettes by outlet header spacer ring 142A, and a fluid inlet header 144 connected to the series of plate cassettes 146 by inlet header spacer ring 144A. Passageway 148 is seen to be created by the extended surface on the outside of each neighboring plate cassette 146 such that an evaporative liquid can be allowed to pass between each plate cassette 146 to provide sensible cooling for the liquid passing within each plate cassette 146. Further, passageway 148 provides space between plate cassettes 146 such that air can be drawn in a counter-current, parallel-current, cross-current fashion, or some combination thereof arrangement between plate cassettes 146 to also provide both sensible and latent heat exchange with the evaporative liquid, and hence provide indirect cooling, heating, condensing, or evaporating for the fluid within plates 146. The spacers, 149, are optional which provide extra structure support to the plate heat exchanger assembly 140 to prevent the extended surface from crushing when the plate heat exchanger assembly 140 is tightened by bolts. Also, the spacers 149 may be used to increase the width of the passageway 148 beyond its natural value which is two times of the height of the extended surface.

Referring now to FIGS. 15-18, a detailed view of plate heat exchanger assembly 150 is shown. Each plate heat exchanger assembly is seen to be comprised of a series of plate pairs or cassettes 156 with a fluid outlet header 152 and a fluid inlet header 154. Each fluid inlet header 154 is connected by a fluid inlet header space ring 154A and fluid outlet header 152 is seen to be connected by a fluid outlet header space ring 152A. The series of plate pairs or cassettes 156 are seen to be spaced from each other by the extended surface pattern on the outside of each plate cassette 156. On each plate, the enhanced surface pattern is on both sides. It is composed of extended surfaces (peaks, 158A) and downwardly extruded surfaces (valleys, 158B). The peaks 158A on one side of the plate is the valleys 158B on the other side (and vice versa). The valleys 158B touch each other to form the internal passageways 159 within the plate pair or cassette 156. The peaks 158A on the outside surface of each plate pair 156 touch the peaks of the neighboring plate pair 156 to form the external passageway 158 (e.g., typically a criss-cross pattern) such that air and evaporative liquid can pass outside and between plate cassettes 156 to provide both good sensible and latent heat exchanges. Each plate cassette 156 is seen to usually have a Chevron or any other surface enhancement pattern on both sides of each cassette assembly 156 to provide increased surface area and turbulent flow to allow improved performance and heat exchange between the fluid within the each cassette 156 and the evaporative liquid passing between each cassette 156. The geometries of the surface enhancement pattern on the plate are strategically selected such that the external passageways 158 formed in the space between each cassette assembly 156 allows good heat and mass transfer between the air and the evaporative liquid which pass concurrently outside and between each cassette 156. This external passageway is usually, but not limited to, a general criss-cross pattern.

In all the embodiments of the present invention, the plates can be comprised of various steels such as stainless steel or other corrosion resistant steels and alloys. It is also possible that such plates can be comprised of other materials that would lead to good heat exchange between the fluid within the plate and the evaporative liquid or air passing outwardly therefrom. Such materials could be aluminum or copper; various alloys, or plastics that provide corrosion resistance and good heat exchange.

What is claimed is:

1. A method of exchanging heat comprising the steps of:
   providing a direct evaporative heat exchange section and an indirect heat exchange section,
   the indirect heat exchange section conducting a fluid stream within a plurality of pathways,
   the direct heat exchange section comprising a top, a bottom, an air inlet, and an air outlet,
   the indirect heat exchange section comprising a top, a bottom, an air inlet and an air outlet,
   the indirect heat exchange section being placed generally above the direct heat exchange section,
   distributing an evaporative liquid generally downward onto and through the indirect heat exchange section such that indirect heat exchange occurs between the fluid stream within the plurality of pathways and the evaporative liquid,
   moving air between the air inlet and the air outlet of the indirect section, and
   moving air between the air inlet and the air outlet of the direct section,
   the air moving through the indirect heat exchange section exchanging both heat and mass with the evaporative liquid moving through the indirect heat exchange section and hence indirectly exchanging heat with the fluid stream within the plurality of pathways in the indirect section,
   the air moving through the direct heat exchange section exchanging heat and mass with the evaporative liquid moving through the direct heat exchange section,
   distributing substantially all of the evaporative liquid leaving the indirect heat exchange section generally downward onto the direct heat exchange section,
   wherein the indirect heat exchange section is comprised of a plate type heat exchanger,
   the plate type heat exchanger comprised of a series of adjacent plate cassettes forming an alternating arrangement of first series of flow passages and a second series of flow passages,
   an inlet header and an outlet header operatively connected to the first series of flow passages such that the fluid stream can pass into the first series of flow passages and out from the first series of flow passages,
   the second series of flow passages arranged such that the evaporative liquid can pass through the second series of flow passages and such that the air moving through the indirect section passes through the second series of flow passages.

2. The method of exchanging heat of claim 1, further comprising:
   collecting substantially all of the evaporative liquid that exits the direct heat exchange section, and
   pumping the collected evaporative liquid upwardly such that it can be distributed generally downward onto and through the indirect heat exchange section.

3. The method of exchanging heat of claim 1, wherein the air moving through the indirect heat exchange section moves generally counter-current to the direction of flow of the evaporative liquid through the indirect heat exchange section.

4. The method of exchanging heat of claim 1, wherein the air moving through the indirect heat exchange section moves generally cross-current to the direction of flow of the evaporative liquid through the indirect heat exchange section.

5. The method of exchanging heat of claim 1, wherein the air moving through the direct heat exchange section moves generally cross-current to the direction of flow of the evaporative liquid through the direct heat exchange section.

6. The method of exchanging heat of claim 1, wherein in the plate type heat exchanger comprised of a series of adjacent plate cassettes
   forming an alternating arrangement of a first series of closed loop flow passages and
   a second series of open loop flow passages,
   each plate cassette in the series of adjacent plate cassettes includes an enhanced surface pattern to increase plate surface area, to increase the sensible heat transfer from the fluid stream within the closed loop first series of flow passages to the evaporative liquid, and to increase the sensible and latent heat transfer from the evaporative liquid to the air moving through the second series of flow passages in the plate type heat exchanger.

7. The method of exchanging heat of claim 1, wherein in the plate type heat exchange comprised of a series of adjacent plate cassettes
   forming an alternating arrangement of a first series of closed loop flow passages and
   a second series of open loop flow passages,
   a second inlet header and a second outlet header are operatively connected to a third series of closed loop flow passages in the plate heat exchanger such that a second fluid stream can pass into the third series of flow passages and out from the third series of flow passages.

8. The method of exchanging heat of claim 1 wherein two direct heat exchange sections and two indirect heat exchange sections are provided, with one indirect heat exchange section located generally above one direct heat exchange section, with the second indirect heat exchange section located generally above the second direct heat exchange section.

9. The method of exchanging heat of claim 1, wherein two direct heat exchange sections are provided, with the indirect heat exchange section located generally above both direct heat exchange sections.

10. The method of exchanging heat of claim 1, wherein the air moving through the indirect heat exchange section moves generally parallel-current to the direction of flow of the evaporative liquid through the indirect heat exchange section.

11. The method of exchanging heat of claim 1 wherein the air moving through the direct heat exchange section moves generally counter-current to the direction of flow of the evaporative liquid through the direct heat exchange section.

12. A method of exchanging heat comprising the steps of:
providing a direct evaporative heat exchange section and an indirect heat exchange section,
the indirect heat exchange section conducting a fluid stream within a plurality of pathways,
the direct heat exchange section comprising a top, a bottom, an air inlet, and an air outlet,
the indirect heat exchange section comprising a top, a bottom, an air inlet and an air outlet,
the indirect heat exchange section being placed generally above the direct heat exchange section,
moving air between the air inlet and the air outlet of the indirect section, and moving air between the air inlet and the air outlet of the direct section,
the air moving through the indirect heat exchange section exchanging heat with the fluid stream within the plurality of pathways in the indirect section,
wherein the indirect heat exchange section is comprised of a plate type heat exchange assembly,
the plate type heat exchange assembly comprised of a series of adjacent plate cassettes
forming an alternating arrangement of a first series of flow passages and a second series of flow passages,
an inlet header and
an outlet header operatively connected to the first series of flow passages such that the fluid stream can pass into the first series of flow passages and out from the first series of flow passages,
the second series of flow passages arranged such that the air moving through the indirect section passes through the second series of flow passages.

13. The method of exchanging heat of claim 12, wherein the air moving through the indirect heat exchange section moves generally counter-current to the direction of flow of the fluid stream through the indirect heat exchange section.

14. The method of exchanging heat of claim 12, wherein the air moving through the indirect heat exchange section moves generally cross-current to the direction of flow of the fluid stream.

15. The method of exchanging heat of claim 12, wherein the air moving through the indirect heat exchange section moves generally parallel-current to the direction of flow of the fluid stream.

16. The method of exchanging heat of claim 12, wherein the plate type heat exchange assembly comprised of a series of adjacent plate cassettes forming an alternating arrangement of a first series of closed loop flow passages and a second series of open loop flow passages,
each plate cassette in the series of adjacent plate cassettes includes an enhanced surface pattern to increase plate surface area and to increase the heat transfer from the fluid stream to the air moving through the second series of open loop flow passages in the plate type heat exchange assembly.

17. The method of exchanging heat of claim 12 wherein the plate type heat exchange assembly comprised of a series of adjacent plate cassettes forming an alternating arrangement of a first series of closed loop flow passages and
a second series of open loop flow passages,
a second inlet header and a second outlet header are operatively connected to a third series of closed loop flow passages in the plate heat exchanger such that a second fluid stream can pass into the third series of flow passages and out from the third series of flow passages.

18. The method of exchanging heat of claim 12 wherein two direct heat exchange sections and
two indirect heat exchange sections are provided, with one indirect heat exchange section located generally above one direct heat exchange section and the second indirect heat exchange section located generally above the second direct heat exchange section.

19. The method of exchanging heat of claim 12, wherein two direct heat exchange sections are provided, and
the indirect heat exchange section located generally above both direct heat exchange sections.

20. A method of exchanging heat comprising the steps of:
providing an indirect heat exchange section,
the indirect heat exchange section conducting a fluid stream within a plurality of pathways,
the indirect heat exchange section comprising a top, a bottom, an air inlet and an air outlet,
distributing an evaporative liquid generally downward onto and through the indirect heat exchange section such that indirect heat exchange occurs between the fluid stream within the plurality of pathways and the evaporative liquid,
moving air between the air inlet and the air outlet of the indirect heat exchange section,
the air moving through the indirect heat exchange sections exchanging heat and mass with the evaporative liquid moving through the indirect heat exchange section and hence indirectly exchanging heat with the fluid stream within the plurality of pathways in the indirection section,
wherein the indirect heat exchange section is comprised of a plate heat exchanger,
the plate heat exchanger comprised of a series of adjacent plate cassettes forming an alternating arrangement of a first series of flow passages and
a second series of flow passages,
an inlet header and
an outlet header operatively connected to the first series of flow passages such that the fluid stream can pass into the first series of flow passages and out from the first series of flow passages,
the second series of flow passages arranged such that the evaporative liquid can pass through the second series of flow passages and such that the air moving through the indirect section passes through the second series of flow passages, wherein
the air moving through the indirect heat exchange section moves counter-current to the direction of flow of the evaporative liquid through the indirect heat exchange section.

21. The method of exchanging heat of claim 20, further comprising:
   collecting substantially all of the evaporative liquid that exits the indirect heat exchange section, and
   pumping the collected evaporative liquid upwardly such that it can be distributed generally downwardly onto and through the indirect heat exchange section.

22. The method of exchanging heat of claim 20 wherein the plate heat exchanger comprised of a series of adjacent plate cassettes forming an alternating arrangement of a first series of closed loop flow passages and
   a second series of open loop flow passages,
   each plate cassette in the series of adjacent plate cassettes includes an enhanced surface pattern to increase plate surface area and to increase the sensible and latent heat transfer from the evaporative liquid to the air moving through the second series of flow passages in the plate heat exchanger.

23. The method of exchanging heat of claim 20 wherein in the plate heat exchanger comprised of a series of adjacent plate cassettes forming an alternating arrangement of a first series of closed loop flow passages and
   a second series of open loop flow passages,
   a second inlet header and a second outlet header are operatively connected to a third series of closed loop flow passages in the plate heat exchanger such that a second fluid stream can pass into the third series of closed loop flow passages and out from the third series of flow passages.

24. The method of exchanging heat of claim 20 wherein the air moving through the indirect heat exchange section moves generally parallel-current to the direction of evaporative liquid through the indirect heat exchange section.

25. A method of exchanging heat comprising the steps of:
   providing an indirect heat exchange section,
   the indirect heat exchange section conducting a fluid stream within a plurality of pathways,
   the indirect heat exchange section comprising a top, a bottom, an air inlet and an air outlet,
   distributing an evaporative liquid generally downward onto and through the indirect heat exchange section such that indirect heat exchange occurs between the fluid stream within the plurality of pathways and the evaporative liquid,
   moving air between the air inlet and the air outlet of the indirect heat exchange section,
   the air moving through the indirect heat exchange sections exchanging heat and mass with the evaporative liquid moving through the indirect heat exchange section and hence indirectly exchanging heat with the fluid stream within the plurality of pathways in the indirection section,
   wherein the indirect heat exchange section is comprised of a plate heat exchanger,
   the plate heat exchanger comprised of a series of adjacent plate cassettes forming an alternating arrangement of a first series of flow passages and
   a second series of flow passages,
   an inlet header and
   an outlet header operatively connected to the first series of flow passages such that the fluid stream can pass into the first series of flow passages and out from the first series of flow passages,
   the second series of flow passages arranged such that the evaporative liquid can pass through the second series of flow passages and such that the air moving through the indirect section passes through the second series of flow passages, wherein
   in the plate heat exchanger comprised of a series of adjacent plate cassettes forming an alternating arrangement of a first series of closed loop flow passages and
   a second series of open loop flow passages,
   a second inlet header and a second outlet header are operatively connected to a third series of closed loop flow passages in the plate heat exchanger such that a second fluid stream can pass into the third series of closed loop flow passages and out from the third series of flow passages.

26. The method of exchanging heat of claim 25, further comprising:
   collecting substantially all of the evaporative liquid that exits the indirect heat exchange section, and
   pumping the collected evaporative liquid upwardly such that it can be distributed generally downwardly onto and through the indirect heat exchange section.

27. The method of exchanging heat of claim 25, wherein the air moving through the indirect heat exchange section moves counter-current to the direction of flow of the evaporative liquid through the indirect heat exchange section.

28. The method of exchanging heat of claim 25 wherein the air moving through the indirect heat exchange section moves generally cross-current to the direction of flow of the evaporative liquid, through the indirect heat exchange section.

29. The method of exchanging heat of claim 25, wherein the plate heat exchanger comprised of a series of adjacent plate cassettes forming an alternating arrangement of a first series of closed loop flow passages and
   a second series of open loop flow passages,
   each plate cassette in the series of adjacent plate cassettes includes an enhanced surface pattern to increase plate surface area and to increase the sensible and latent heat transfer from the evaporative liquid to the air moving through the second series of flow passages in the plate heat exchanger.

30. The method of exchanging heat of claim 25 wherein the air moving through the indirect heat exchange section moves generally parallel-current to the direction of evaporative liquid through the indirect heat exchange section.

31. A method of exchanging heat comprising the steps of:
   providing an indirect heat exchange section,
   the indirect heat exchange section conducting a fluid stream within a plurality of pathways,
   the indirect heat exchange section comprising a top, a bottom, an air inlet and an air outlet,
   distributing an evaporative liquid generally downward onto and through the indirect heat exchange section such that indirect heat exchange occurs between the fluid stream within the plurality of pathways and the evaporative liquid,
   moving air between the air inlet and the air outlet of the indirect heat exchange section,
   the air moving through the indirect heat exchange sections exchanging heat and mass with the evaporative liquid moving through the indirect heat exchange section and hence indirectly exchanging heat with the fluid stream within the plurality of pathways in the indirection section,
   wherein the indirect heat exchange section is comprised of a plate heat exchanger,
   the plate heat exchanger comprised of a series of adjacent plate cassettes forming an alternating arrangement of a first series of flow passages and a second series of flow passages,
an inlet header and
an outlet header operatively connected to the first series of flow passages such that the fluid stream can pass into the first series of flow passages and out from the first series of flow passages,
the second series of flow passages arranged such that the evaporative liquid can pass through the second series of flow passages and such that the air moving through the indirect section passes through the second series of flow passages, wherein the air moving through the indirect heat exchange section moves generally parallel-current to the direction of evaporative liquid through the indirect heat exchange section.

32. The method of exchanging heat of claim 31, further comprising:
    collecting substantially all of the evaporative liquid that exits the indirect heat exchange section, and
    pumping the collected evaporative liquid upwardly such that it can be distributed generally downwardly onto and through the indirect heat exchange section.

33. The method of exchanging heat of claim 31, wherein the air moving through the indirect heat exchange section moves counter-current to the direction of flow of the evaporative liquid through the indirect heat exchange section.

34. The method of exchanging heat of claim 31 wherein the air moving through the indirect heat exchange section moves generally cross-current to the direction of flow of the evaporative liquid, through the indirect heat exchange section.

35. The method of exchanging heat of claim 31 wherein the plate heat exchanger comprised of a series of adjacent plate cassettes forming an alternating arrangement of a first series of closed loop flow passages and
    a second series of open loop flow passages,
    each plate cassette in the series of adjacent plate cassettes includes an enhanced surface pattern to increase plate surface area and to increase the sensible and latent heat transfer from the evaporative liquid to the air moving through the second series of flow passages in the plate heat exchanger.

36. The method of exchanging heat of claim 31 wherein in the plate heat exchanger comprised of a series of adjacent plate cassettes forming an alternating arrangement of a first series of closed loop flow passages and
    a second series of open loop flow passages,
    a second inlet header and a second outlet header are operatively connected to a third series of closed loop flow passages in the plate heat exchanger such that a second fluid stream can pass into the third series of closed loop flow passages and out from the third series of flow passages.

* * * * *